United States Patent
Park

(10) Patent No.: US 7,420,717 B2
(45) Date of Patent: Sep. 2, 2008

(54) METHOD AND APPARATUS FOR SCANNING IMAGE

(75) Inventor: Ji-sub Park, Gyeonggi-do (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 988 days.

(21) Appl. No.: 10/734,592

(22) Filed: Dec. 15, 2003

(65) Prior Publication Data
US 2004/0174572 A1 Sep. 9, 2004

(30) Foreign Application Priority Data
Dec. 23, 2002 (KR) ............... 10-2002-0082379

(51) Int. Cl.
*H04N 1/04* (2006.01)
(52) U.S. Cl. ............... 358/474; 358/486; 358/488; 358/497; 358/449
(58) Field of Classification Search ............... 358/497, 358/494, 474, 488, 486, 505, 449, 465, 466, 358/443, 448; 382/312, 318, 319, 270, 271, 382/273
See application file for complete search history.

(56) References Cited

U.S. PATENT DOCUMENTS

| | | | | |
|---|---|---|---|---|
| 4,875,104 | A * | 10/1989 | Kamon | 358/400 |
| 5,987,270 | A * | 11/1999 | Hulan et al. | 399/45 |
| 6,937,369 | B2 * | 8/2005 | Shih et al. | 358/486 |
| 2003/0179421 | A1 * | 9/2003 | Lee | 358/497 |

FOREIGN PATENT DOCUMENTS

| | | |
|---|---|---|
| JP | 07-111579 | 4/1995 |
| JP | 11-84549 | 3/1999 |

* cited by examiner

*Primary Examiner*—Cheukfan Lee
(74) *Attorney, Agent, or Firm*—Staas & Halsey LLP

(57) ABSTRACT

A method and an apparatus for scanning an image. The method includes determining a first side of the periphery of an original document while moving an image sensor, detecting first and second reference points representing first and second end points of the first side, scanning an image between the first and second reference points, and determining a second side of the original document opposite to the first side, wherein the scanning is stopped.

19 Claims, 7 Drawing Sheets

METHOD AND APPARATUS FOR SCANNING IMAGE

CROSS-REFERENCE TO RELATED APPLICATIONS

This application claims the priority of Korean Patent Application No. 10-2002-0082379, filed on Dec. 23, 2002, in the Korean Intellectual Property Office, the disclosure of which is incorporated herein in its entirety by reference.

BACKGROUND OF THE INVENTION

1. Field of the Invention

The present invention relates to image formation using an image sensor, and more particularly, to a method and an apparatus for an image processing apparatus which scans an image of an original document having a rectangular shape, line by line.

2. Description of the Related Art

In general, an image processing apparatus, such as an image scanner, facsimile, digital copier, or the like includes a central processing portion, an image sensor, an image reading portion, a memory portion, a computer interfacing portion, an information input/output portion and the like.

The central processing portion controls the overall operation of the above-mentioned devices. Particularly, the central processing portion stores image data acquired by the image sensor in the memory portion, and controls data conversion.

The image sensor emits light of a light source to an original document, and converts reflected light into an electrical output with a CCD (charge coupled device) and a CIS (contact image sensor).

The image reading portion causes an image converted into the electrical output to be stored in a data memory device such as a hard disk of a computer.

The memory portion stores image data transmitted from the image reading portion according to the control of the central processing portion, and stores other program data required for control operations of the central processing portion.

The computer interfacing portion acts as a path to transmit read image data to the computer.

The information input/output portion has a plurality of keys, applies data to the central processing portion when a predetermined key is selected, and displays operation status of the image processing apparatus controlled by the central processing portion.

However, a conventional image processing apparatus can process an image in a manner in which the size of an original document is sensed and the scanned image is equal to the sensed area of the original document. First, in the sensing of the size of the original document, after the periphery of the original document is exhibited clearly by lowering the resolution of the whole area of the image in a mode called a free scanning mode, information concerning the size of the original document is acquired. Subsequently, the size of the read image is the same as the size of the original document. The size of the original document is based on the information concerning the size of the original document while the resolution designated by a user is taken into consideration.

Therefore, in order to acquire an image in the conventional art, the image can be acquired after the scanning operation of the image is performed twice. Consequently, when a small document such as a business card or post card is copied, there is no way to scan the small document without preliminary free scanning, and when the free scanning is performed, the free scanning causes time consumption equal to the time required for the free scanning.

SUMMARY OF THE INVENTION

Accordingly, it is an aspect of the present invention to provide a method of scanning an image, which is capable of scanning an image in a single scan by detecting the periphery of an original document.

It is another aspect of the present invention to provide an apparatus to scan an image, which is capable of performing the above method of scanning an image.

Additional aspects and/or advantages of the invention will be set forth in part in the description which follows and, in part, will be obvious from the description, or may be learned by practice of the invention.

The foregoing and/or other aspects are achieved by providing a method of scanning an image by reading and scanning an original document line by line using an image sensor, the method including: determining a first side of a periphery of the original document while moving the image sensor; detecting first and second reference points representing first and second end points of the first side; scanning an image between the first and second reference points; and determining a second side of the original document opposite to the first side, wherein the scanning is stopped.

The foregoing and/or other aspects are also achieved by an apparatus for scanning an image by reading and scanning an original document line by line, the apparatus including: an image sensor scanning an image of the original document; a periphery detecting portion detecting a periphery of the original document; a reference point detecting portion detecting a plurality of reference points from the periphery of the original document; and an image scanning controlling portion controlling the image sensor to scan the image based on the detecting by the periphery detecting portion and the reference point detecting portion.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
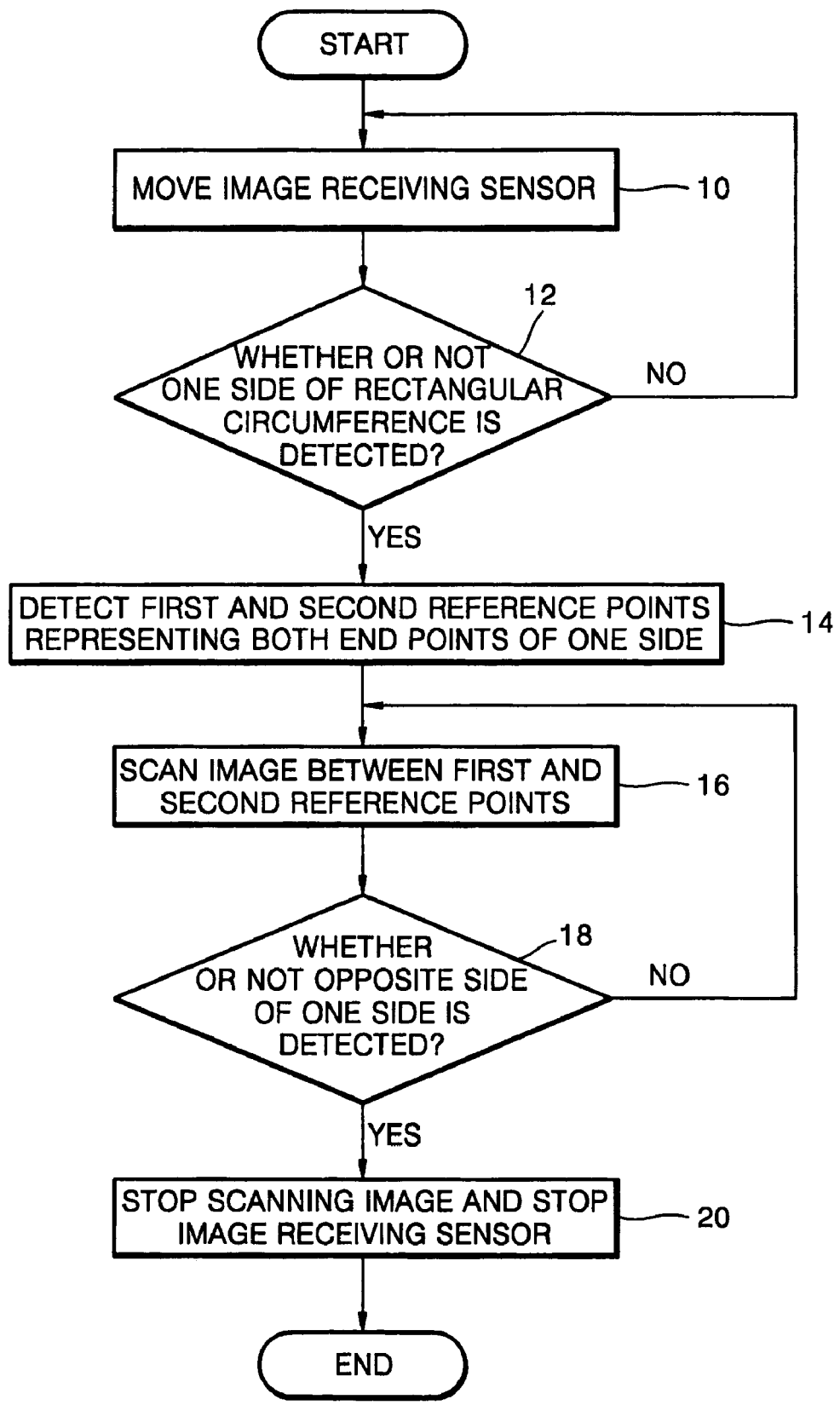
FIG. 1 is a flowchart describing of a method of scanning an image according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1 is a flowchart to describe a method of scanning an image according to an embodiment of the present invention. Referring to FIG. 1, a method of scanning an image includes detecting one side or the opposite side of the periphery of an original document, and scanning an image or stopping scanning the image (operations 10, 12, 14, 16, 18 and 20).

First, an image sensor is moved (operation 10). While the image sensor is moved below a flatbed, the image sensor emits light of a light source toward the original document and detects light reflected from the original document.

After operation 10, it is determined whether or not the one side of the rectangular periphery of the original document is detected (operation 12). A document the size of which is relatively smaller than the size of the flatbed (such as a small calling card, postcard, or the like) can be exemplified as an original document having a rectangular periphery. The periphery of a rectangle has 4 sides. Therefore, in operation 12, it is determined whether or not the one side of the four sides is detected. When it is determined that the one side of the rectangular periphery is not detected, operation 10 follows operation 12.

Figure 2:
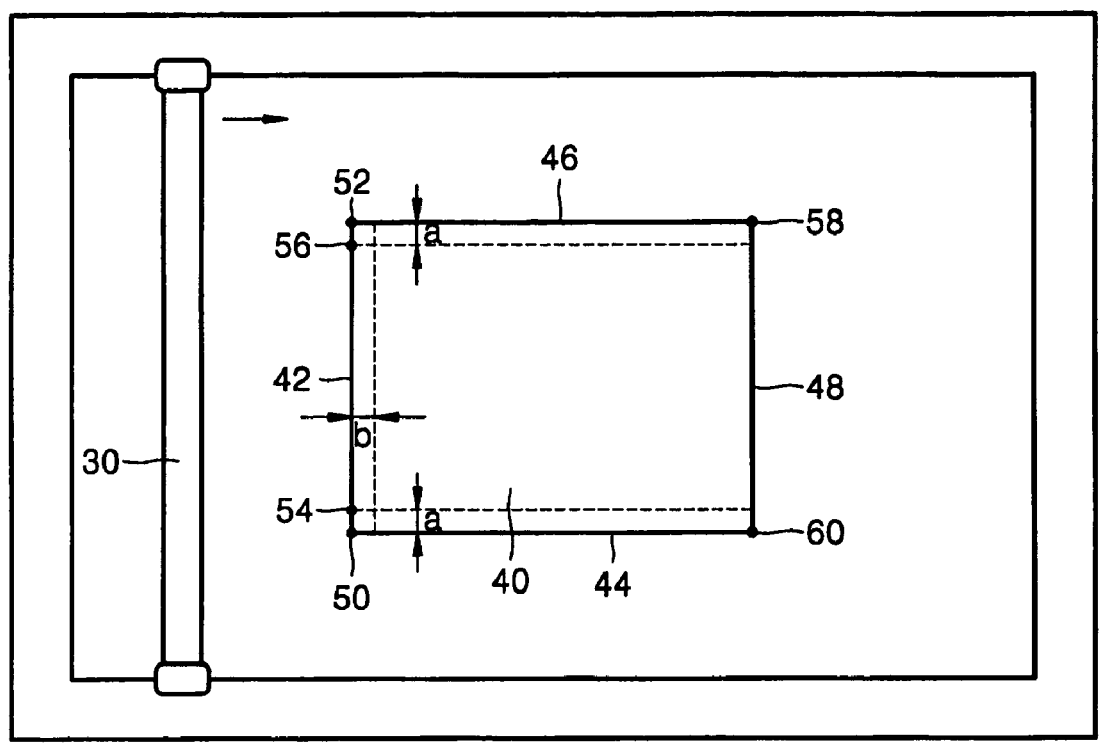
FIG. 2 is a diagram showing an original document laid on a flatbed as an example to describe the method shown in FIG. 1 in detail.
Figure 3:
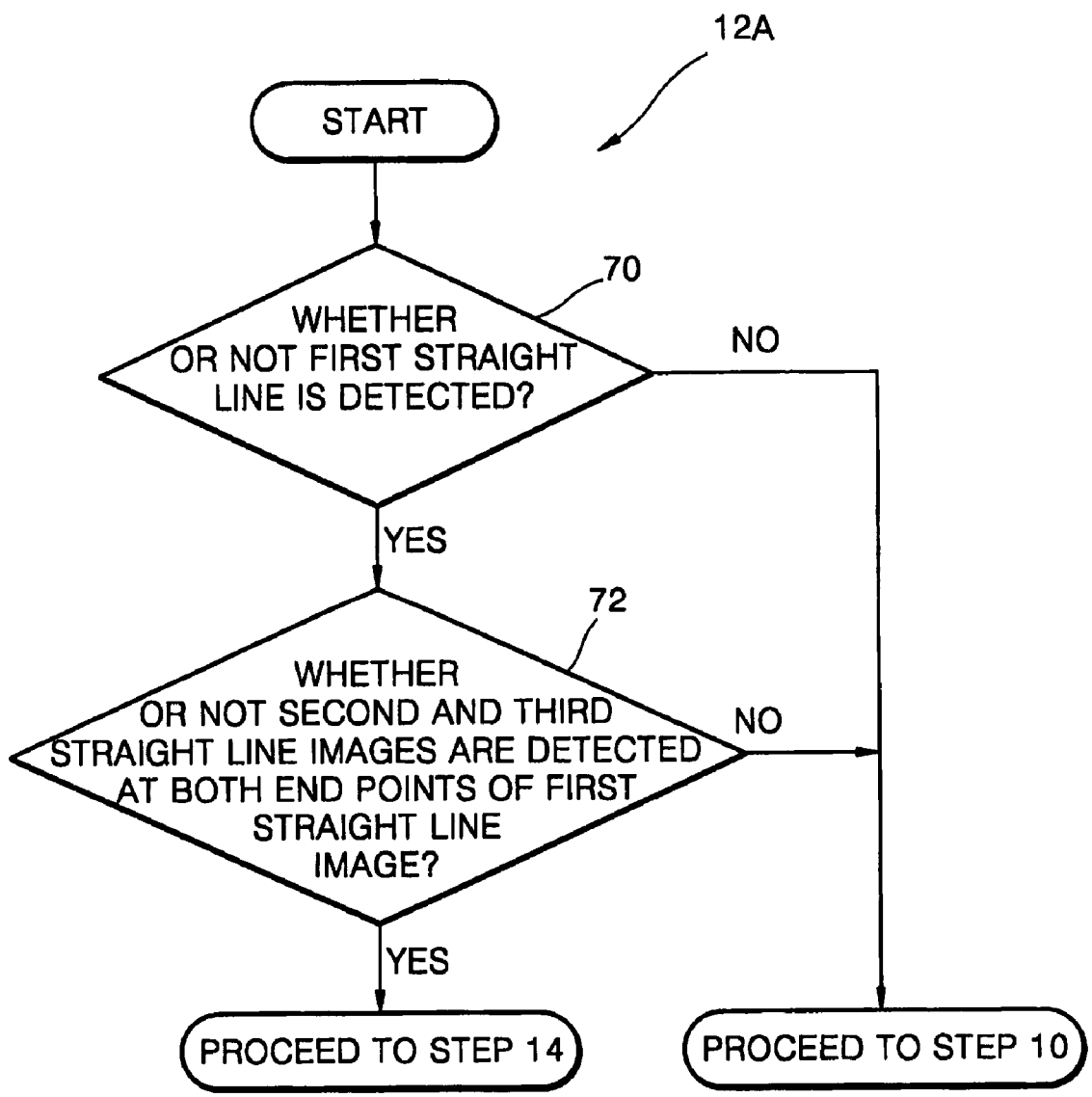
FIG. 3 is a flowchart for describing operation 12 shown in FIG. 1.

FIG. 2 is a diagram showing the original document laid on the flatbed, and FIG. 3 is a flowchart for describing operation 12 shown in FIG. 1. The operation 12 shown in FIG. 3 includes operations 70 and 72 of deciding whether or not a first straight-line image, a second straight-line image, and a third straight-line image are detected.

First, it is determined whether or not a first straight-line image is detected (operation 70). Four sides 42, 44, 46, and 48 of the original document 40 shown in FIG. 2 are shown as straight lines when displayed as an image. When the first straight-line image is detected, the first straight-line image may be an image of the one side 42 of the periphery of the original document 40. Therefore, referring to FIG. 2, it can be seen that the first straight-line image detected by an image sensor 30 must be an image of the one side 42 of the periphery of the original document. Even though it cannot be determined whether or not the first straight-line image is the one side 42 of the periphery of the original document until operation 72 is performed, operation 70 is still necessary to decide whether or not the first straight-line image is the one side 42 of the periphery of the original document. When it is decided that the first straight-line image is not detected, operation 10 follows operation 70. Since when it is decided that the first straight-line image is not detected, it means that the image sensor 30 has not reached the original document 40 yet, the image sensor 30 continues to move toward the original document 40.

However, when the first straight-line image is detected, it is determined whether or not the second and third straight-line images are detected to be greater than a predetermined length at both end points of the first straight-line image in a moving direction of the image sensor 30 (operation 72). The both end points of the first straight-line image are indicated by reference numerals 50 and 52, as shown in FIG. 2. That is, the both end points 50 and 52 of the first straight-line image are both end points of the one side 42 of the periphery of the original document 40. It can be seen that the second and third straight-line images represent the images of the other two sides 44 and 46 of the periphery of the original document 40. Whether or not the second and third straight-line images are portions of the periphery of the original document 40 can be decided by deciding whether or not the second and third straight-line images are detected at the both end points 50 and 52 of the first straight-line image.

When it is determined that the second and third straight-line images are detected at the both end points 50 and 52 of the first straight-line image, operation 14 follows operation 72. On the other hand, when it is determined that the second and third straight-line images are not detected at the both end points 50 and 52 of the first straight-line image, operation 10 follows operation 72. If the second and third straight-line images are not detected at the both end points 50 and 52 of the first straight-line image indicates that the first straight-line image is not an image of the one side 42 of the original document 40, but is only a general straight-line image. Therefore, the image sensor 30 does not reach the original document 40 yet.

When it is determined that the one side is detected in operation 12, a first reference point and a second reference point representing the both end points 50 and 52 of the one side 42 are detected (operation 14). As shown in FIG. 2, the both end points 50 and 52 of the one side 42 are set to be the first and second reference points, respectively. Therefore, the first reference point is indicated by reference numeral 50, and the second reference point is indicated by reference numeral 52.

After operation 14, an image between the first reference point 50 and the second reference point 52 is inputted and read (operation 16). While the image sensor 30 moves, the image sensor 30 reads the image between the first reference point 50 and the second reference point 52, and scanning of the read image is completed.

Figure 4:
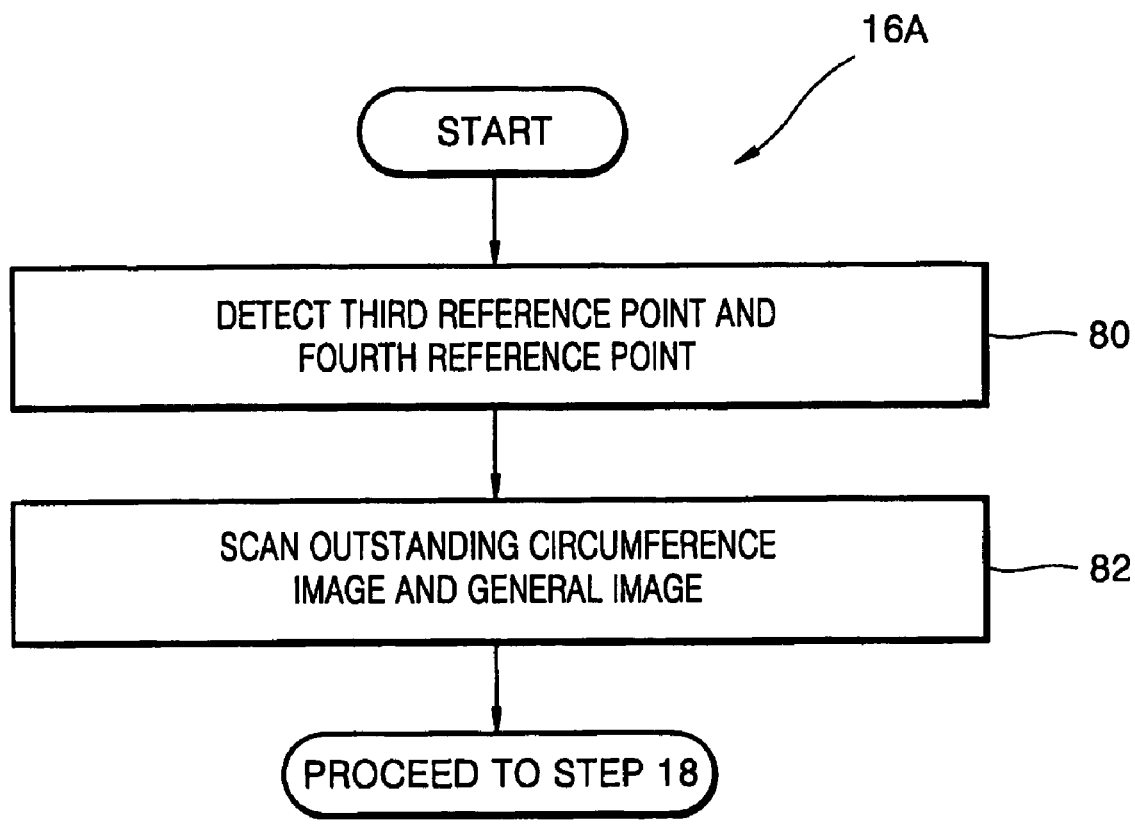
FIG. 4 is a flowchart for describing operation 16 shown in FIG. 1.

FIG. 4 is a flowchart for describing operation 16 shown in FIG. 1. The operation 16 includes the operations (80 and 82) of detecting a third reference point 54 and a fourth reference point 56, and scanning an outstanding-periphery image and a general image.

First, the third reference point 54 having a predetermined distance from the first reference point 50 is detected, and the fourth reference point 56 having the predetermined distance from the second reference point 54 is detected (operation 80). The third reference point 54 and the fourth reference point 56 are designated on the one side 42 to have a predetermined distance "a" from the first and second reference points 50 and 52, respectively.

After operation 80, an image between the first and third reference points 50 and 54 and an image between the second and fourth reference points 52 and 56 are scanned as outstanding-periphery images of the original document 40, and an image between the third and fourth reference points 54 and 56 is scanned as a general image (operation 82). The outstanding-periphery image is an image which is clearly shaded so that the shape of the periphery of the original document 40 can be definitely expressed. Therefore, the third reference point 54 is positioned near the first reference point 50 so that an actual scanning portion of the original document which a user wants to scan cannot be infringed. Being similar to the third reference point 54, the fourth reference point 56 is positioned near the second reference point. What is called the general image is an image, i.e., a predetermined area of the original document which is scanned according to the resolution, shades, and the like which are set by a user. Therefore, an image required by the user can be obtained by scanning the image between the third and fourth reference points 54 and 56.

In addition, while the above scanning is performed in operation 82, a predetermined line image is scanned as an outstanding-periphery image after the one side is detected, and an image following the predetermined line image is scanned as a general image. The predetermined line image represents an image of a portion which has a width "b" and is shaded so that the one side 42 can be definitely expressed. The width "b" of the predetermined line image has the same value as the distance "a" between the first and third reference points 50 and 54, or the distance "a" between the second and fourth reference points 52 and 56.

After operation 16, it is determined whether or not the opposite side of the one side 42 is detected (operation 18). As shown in FIG. 2, the one side 42 and the opposite side 48 face each other. When it is determined that the opposite side 48 is not detected, operation 16 follows operation 18.

Figure 5:
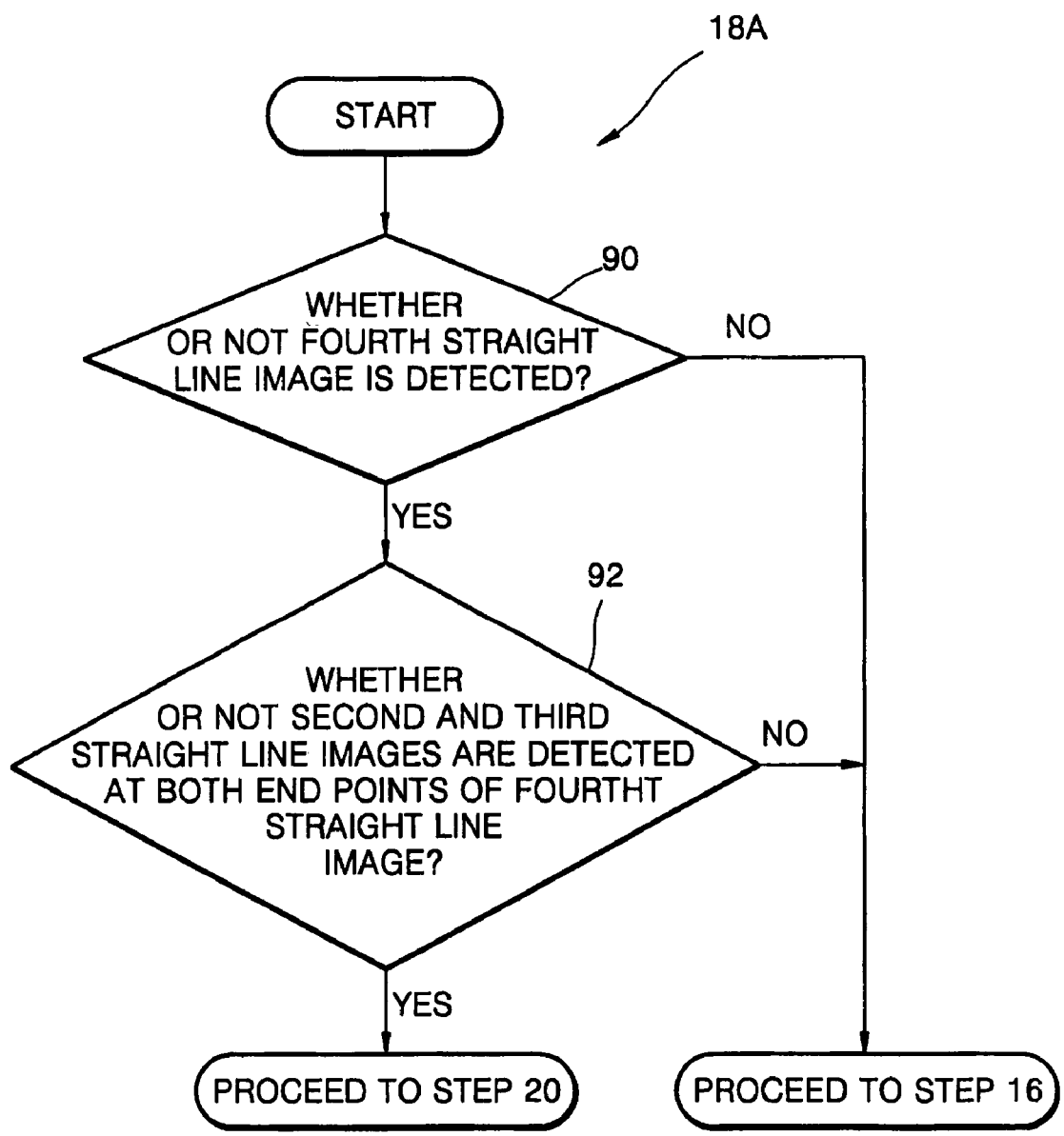
FIG. 5 is a flowchart for describing operation 18 shown in FIG. 1.

FIG. 5 is a flowchart for describing operation 18 shown in FIG. 1. The operation 18 includes steps 90 and 92 of deciding whether or not the fourth straight-line image and the second and third straight-line images are detected.

First, it is determined whether or not the fourth straight-line image is detected (operation 90). Referring to FIG. 2, when the fourth straight-line image is detected, the fourth straight-line image may be the side 48 opposite to the one side 42 of the original document 40. Even though it cannot be determined whether or not the fourth straight-line image is the opposite side 48 until operation 92 is performed, operation 90 is still necessary to decide whether or not the fourth straight-line image is the opposite side 48. When it is determined that the fourth straight-line image is not detected, operation 16 follows operation 90.

However, when it is determined that the fourth straight-line image is detected, it is determined whether or not the second and third straight-line images are detected more than a predetermined length from both ends of the fourth straight-line image in the moving direction of the image sensor 30 (operation 92). The predetermined length is a length long enough to decide whether or not the second and third straight-line images are straight lines. The both end points of the fourth straight-line image are indicated by reference numerals 58 and 60, as shown in FIG. 2. That is, the both end points 58 and 60 of the fourth straight-line image represent both end points of the opposite side 48 of the periphery of the original document. Whether or not the fourth straight line is a portion of the periphery of the original document 40 can be decided by deciding whether or not the second and third straight-line images are detected at the both end points 58 and 60 of the fourth straight-line in the moving direction of the image sensor 30.

When it is determined that the second and third straight-line images are detected at the end points 58 and 60 of the fourth straight-line in the moving direction of the image sensor 30, operation 16 follows operation 92. That is, the fact that the second and third straight-line images are detected at the both end points 58 and 60 of the fourth straight-line image means that the fourth straight-line image is not an image of the opposite side 48 of the original document 40, but a general straight-line image. On the other hand, when it is decided that the second and third straight-line images are not detected at the both end points 58 and 60 of the fourth straight-line in the moving direction of the image sensor, operation 20 follows operation 92. Operation 20 includes stopping the image sensor and the scanning of the image. That is, the fact that the second and third straight-line images are not detected at the both end points 58 and 60 of the fourth straight-line image means that the fourth straight-line image is an image of the opposite side 48 of the original document 40.

When it is determined that the opposite side 48 is detected in operation 18, scanning of the image is stopped, and the image sensor is stopped from moving. Since the fact that the opposite side 48 is detected means that the marginal portion of the periphery of the original document is detected, scanning of the image is stopped, and the image sensor is stopped from moving.

Now, an apparatus to scan an image according to the embodiment of the present invention will be described with reference to the attached drawings.

Figure 6:
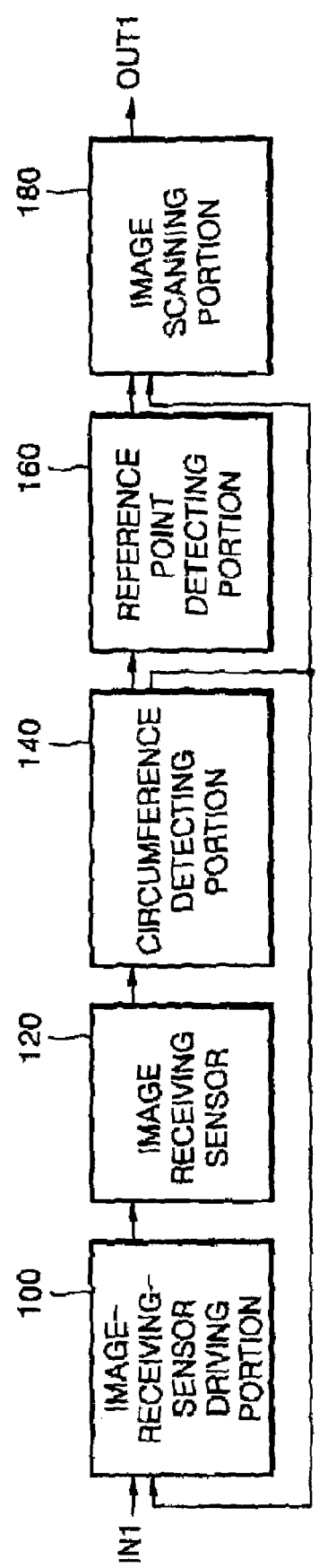
FIG. 6 is a block diagram of an apparatus to scan an image according to an embodiment of the present invention.

FIG. 6 is a block diagram of the apparatus, which includes an image sensor driving portion 100, an image sensor 120, a periphery detecting portion 140, a reference point detecting portion 160, and an image scanning controlling portion 180.

In order to perform operation 10 and operation 20, responding to a control signal inputted via an input terminal IN1, the image sensor driving portion 100 moves the image sensor 120 on a flatbed or stops the image sensor 120.

The image sensor 120 emits light from a light source toward the original document, receives reflected light, and outputs the received light image to the periphery detecting portion 140.

In order to perform operations 12 and 18, the periphery detecting portion 140, responding to the image inputted from the image sensor 120, detects one side of a rectangular periphery of the original document 40 or the opposite side 48, and outputs the detected results. The periphery detecting portion 140, responding to the image inputted from the image sensor 120, detects the one side 42 of the rectangular periphery, and outputs the detected results to the reference point detecting portion 160. In addition, the periphery detecting portion 140 detects the opposite side 48 of the rectangular periphery, and outputs the detected result to the image scanning controlling portion 180.

Figure 7:
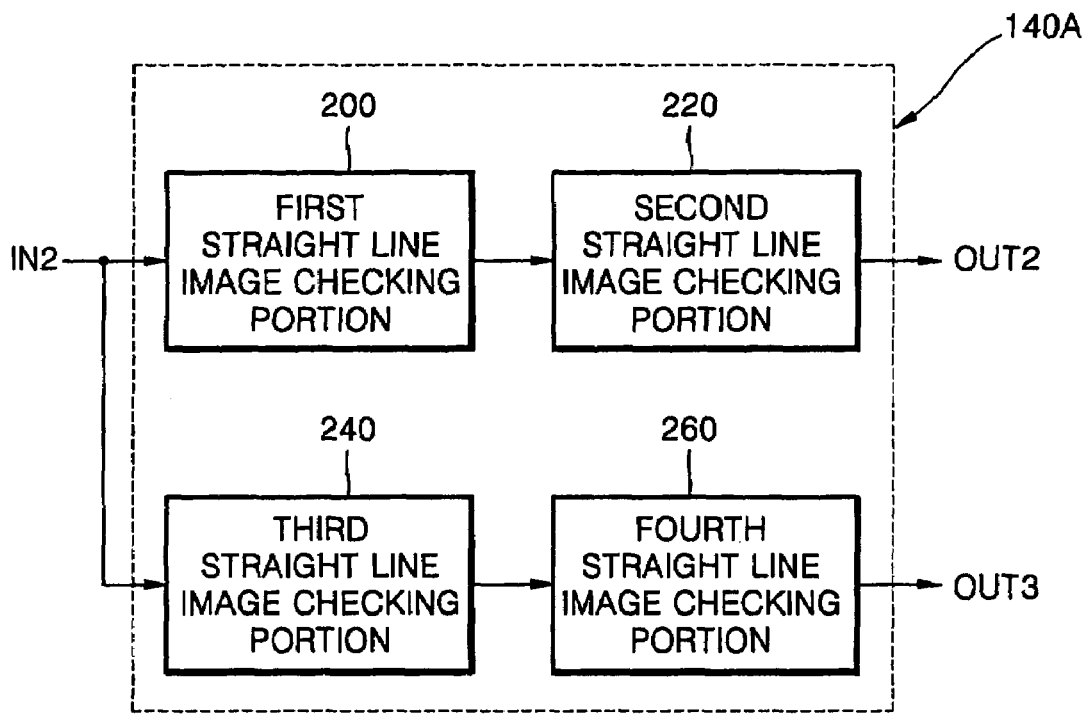
FIG. 7 is a block diagram of a periphery detecting portion shown in FIG. 6.

FIG. 7 is a block diagram for describing the periphery detecting portion 140. The periphery detecting portion 140 includes a first detecting portion 200, a second detecting portion 220, a third detecting portion 240, and a fourth detecting portion 260.

In order to perform operation 70, the first detecting portion 200 detects the first straight line corresponding to the one side 42, and outputs the detected results as a first detect signal. The first detecting portion 200 receives an image from the image sensor 120 via an input terminal IN2, detects whether or not the received image is the first straight line image corresponding to the one side 42 shown in FIG. 2, and outputs the detected results as the first detect signal to the second detecting portion 220.

In order to perform operation 72, the second detecting portion 220, responding to the first detect signal, detects whether or not the second and third straight line images are detected to be greater than the predetermined length at both end points 50 and 52 of the first straight line image in the moving direction of the image sensor 120, and outputs the detected results as a second detect signal. The second detecting portion 220, responding to the first detect signal inputted from the first detecting portion 200, detects the second and third straight line images, and outputs the detected results as the second detect signal via an output terminal OUT2.

In order to perform operation 90, the third detecting portion 240 detects the fourth straight line image corresponding to the opposite side 48, and outputs the detected results as a third detect signal. The third detecting portion 240 receives an image from the image sensor 120 via the input terminal IN2, detects whether or not the received image is the fourth straight line image corresponding to the opposite side 48 shown in FIG. 2, and outputs the detected results as the third detect signal to the fourth detecting portion 260.

In order to perform operation 92, the fourth detecting portion 260, responding to the third detect signal, detects whether or not the second and third straight line images are detected to be greater than the predetermined length at the both end points 58 and 60 of the fourth straight line image in the moving direction of the image sensor 120, and outputs the detected results as a fourth detect signal. The fourth detecting portion 260, responding to the third detect signal inputted from the third detecting portion 240, checks the second and third straight line images, and outputs the detected results as the fourth detect signal via an output terminal OUT3.

In order to perform operation 14, the reference point detecting portion 160, responding to the detected results from the periphery detecting portion 140, detects the first reference point 50 and the second reference point 52 which represent the both end points of the one side, and outputs the detected first and second reference points 50 and 52. The reference point detecting portion 160 receives the detected results of the one side 42 shown in FIG. 2 from the periphery detecting portion 140, detects the first reference point 50 and the second reference point 52 which represent the both end points of the one side 42, and outputs the detected first and second reference points 50 and 52 to the image scanning controlling portion 180.

In order to perform operation 16, the image scanning controlling portion 180 scans and controls to stop scanning an image between the detected first and second reference points. The image scanning controlling portion 180, responding to the detected first and second reference points 50 and 52 inputted from the reference point detecting portion 160, outputs a signal to control to scan the image between the first and second reference points 50 and 52 via an output terminal OUT1. In addition, the image scanning controlling portion 180, responding to the detected results from the periphery detecting portion 140, stops scanning the image between the first and second reference points 50 and 52.

Figure 8:
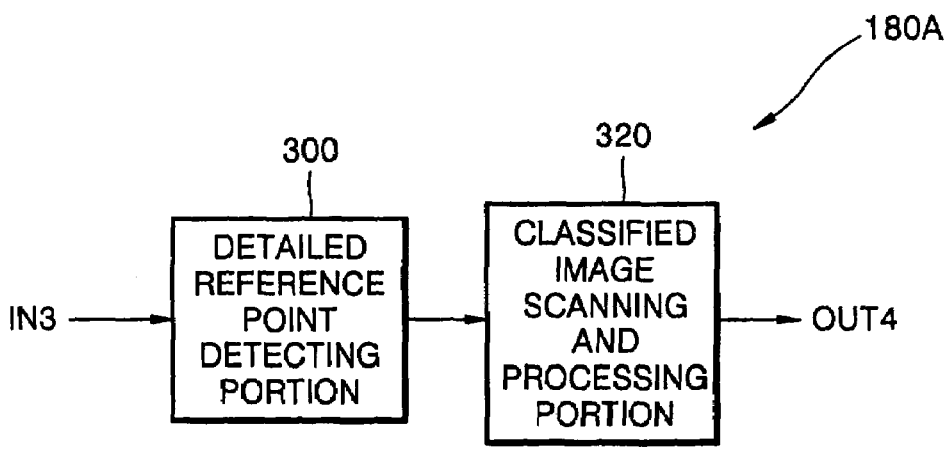
FIG. 8 is a block diagram of an image scanning controlling portion shown in FIG. 6.

FIG. 8 is a block diagram of the image scanning controlling portion 180, which includes a detailed-reference-point detecting portion 300, and a classified image scanning and processing portion 320.

In order to perform operation 80, the detailed-reference-point detecting portion 300 detects the third reference point 54 having the predetermined distance from the first reference point 50, and the fourth reference point 56 having the predetermined distance from the second reference point 52. The detailed-reference-point detecting portion 300 receives the first reference point 50 from the reference point detecting portion 160 via an input terminal IN3, detects the third reference point 54 having the predetermined distance from the first reference point 50, and outputs the detected third reference point 54 together with the first reference point 50 to the classified image scanning and processing portion 320. The detailed-reference-point detecting portion 300 receives the second reference point 52 from the reference point detecting portion 160 via the input terminal IN3, detects the fourth reference point 56 having the predetermined distance from the second reference point 52, and outputs the detected fourth reference point 56 together with the second reference point 52 to the classified image scanning and processing portion 320.

In order to perform operation 82, responding to the detected first, second, third, and fourth reference points 50, 52, 54 and 56, the classified image scanning and processing portion 320 controls the image sensor 120 to scan the image between the first and third reference points 50 and 54 and the image between the second and fourth reference points 52 and 56 as the outstanding-periphery image, and controls the image sensor 120 to scan the image between the third and fourth reference points 54 and 56 as the general image. Responding to the first and third reference points 50 and 54 inputted from the detailed-reference-point detecting portion 300, the classified image scanning and processing portion 320 controls the image sensor 120 to scan the image between the first and third reference points 50 and 54 as the outstanding-periphery image. In addition, responding to the second and fourth reference points 52 and 56 inputted from the detailed-reference-point detecting portion 300, the classified image scanning and processing portion 320 controls the image sensor 120 to scan the image between the second and fourth reference points 52 and 56 as the outstanding-periphery image. In addition, responding to the third and fourth reference points 54 and 56 inputted from the detailed-reference-point detecting portion 300, the classified image scanning and processing portion 320 controls the image sensor 120 to scan the image between the third and fourth reference points 54 and 56 as the general image. The classified image scanning and processing portion 320 outputs a control signal to scan outstanding-periphery image and the general image of the original document via an output terminal OUT4.

In addition, the classified image scanning and processing portion 320 controls the image sensor 120 to scan the predetermined line of the original document as the outstanding-periphery image after the one side is detected, and controls the image sensor 120 to scan the image after the predetermined line as the general image.

As described above, the method and the apparatus to scan an image according to the embodiments of the present invention are capable of scanning an image by moving the image sensor once without scanning an original document to detect the size of the original document in advance in a flatbed type image processing apparatus, and is capable of markedly shortening image scanning time by preventing the image sensor from moving beyond the area of the original document to be scanned.

Although a few embodiments of the present invention have been shown and described, it would be appreciated by those skilled in the art that changes may be made in the embodiments without departing from the principles and spirit of the invention, the scope of which is defined in the claims and their equivalents.

What is claimed is:

1. A method of scanning an image by reading and scanning an original document line by line using an image sensor, the method comprising:
   determining whether a first side of the periphery of the original document is detected while moving the image sensor;
   detecting first and second reference points respectively representing first and second end points of the first side;
   scanning an image between the first and second reference points after detecting the first and second reference points;
   determining whether a second side of the original document opposite to the first side, is detected; and
   stopping the scanning.

2. A method of scanning an image by reading and scanning an original document line by line using an image sensor, the method comprising:
   determining whether a first side of the periphery of the original document is detected while moving the image sensor;

detecting first and second reference points respectively representing first and second end points of the first side;
scanning an image between the first and second reference points;
determining whether a second side of the original document opposite to the first side, is detected; and
stopping the scanning,
wherein the determining whether the first side of the periphery of the original document is detected comprises:
determining whether a first straight line image corresponding to the first side is detected; and
if the first straight line image is detected, determining whether second and third straight line images are detected more than a predetermined distance from the first and second end points of the first straight line image in a moving direction of the image sensor, and detecting the first straight line image as the first side.

3. The method according to claim 2, wherein a starting point and an ending point of the first side correspond to the first and second end points of the first straight line image.

4. The method according to claim 2, wherein the second and third straight-line images respectively correspond to the second side and a third side of the document.

5. The method according to claim 2, further comprising determining whether the detected second and third straight line images are at the first and second end points, wherein the moving of the image sensor occurs after the determining that the second and third straight line images are not at the first and second end points.

6. A method of scanning an image by reading and scanning an original document line by line using an image sensor, the method comprising:
determining whether a first side of the periphery of the original document is detected while moving the image sensor;
detecting first and second reference points respectively representing first and second end points of the first side;
scanning an image between the first and second reference points after detecting the first and second reference points;
determining whether a second side of the original document opposite to the first side, is detected; and
stopping the scanning,
wherein the scanning the image between the first and second reference points comprises:
detecting a third reference point having a predetermined distance from the first reference point, and a fourth reference point having the predetermined distance from the second reference point; and
scanning between the first and third reference points and between the second and fourth reference points as an outstanding-periphery portion of the image, and scanning between the third and fourth reference points as a general portion of the image.

7. The method according to claim 6, wherein the scanning as the outstanding-periphery portion comprises scanning a predetermined line as the outstanding-periphery portion after the detecting of the first side, and the general portion is scanned after the scanning of the predetermined line.

8. A method of scanning an image by reading and scanning an original document line by line using an image sensor, the method comprising:
determining whether a first side of the periphery of the original document is detected while moving the image sensor;
detecting first and second reference points respectively representing first and second end points of the first side;
scanning an image between the first and second reference points after detecting the first and second reference points;
determining whether a second side of the original document opposite to the first side, is detected; and
stopping the scanning,
wherein the determining whether the second side of the original document is detected comprises:
determining whether a fourth straight line image opposite to the first straight line image is detected; and
if the fourth straight line image is detected, determining whether second and third straight line images are detected more than a predetermined distance from ends of the fourth straight line image in a moving direction of the image sensor, and detecting the fourth straight line image as the second side.

9. An apparatus for scanning an image by reading and scanning an original document line by line, the apparatus comprising:
an image sensor scanning an image of the original document;
a periphery detecting portion detecting a periphery of the original document;
a reference point detecting portion detecting a plurality of reference points from the periphery of the original document;
an image scanning controlling portion controlling the image sensor to scan the image based on the detecting by the periphery detecting portion and the reference point detecting portion; and
determining whether a plurality of straight line images are detected more than a predetermined distance from the detected reference points.

10. The apparatus according to claim 9, further comprising a flatbed, wherein the image sensor is moved below the flatbed.

11. An apparatus for scanning an image by reading and scanning an original document line by line, the apparatus comprising:
an image sensor scanning an image of the original document;
a periphery detecting portion detecting a periphery of the original document;
a reference point detecting portion detecting a plurality of reference points from the periphery of the original document; and
an image scanning controlling portion controlling the image sensor to scan the image based on the detecting by the periphery detecting portion and the reference point detecting portion,
wherein the periphery detecting portion comprises:
a first detecting portion detecting a first straight line image corresponding to a first side of the periphery of the original document;
a second detecting portion detecting whether second and third straight line images are detected more than a first predetermined distance from first and second end points of the first straight line image in a moving direction of the image;
a third detecting portion detecting a fourth straight line image corresponding to a second side of the original document; and
a fourth detecting portion detecting whether the second and third straight line images are detected further than a second predetermined distance from end points of the fourth straight line image in the moving direction of the image sensor.

12. The apparatus according to claim 11, wherein the plurality of reference points detected by the reference point detecting portion comprise first and second reference points representing first and second end points of the first side and the image scanning controlling portion comprises:

a detailed-reference-point detecting portion detecting a third reference point having a third predetermined distance from the first reference point and a fourth reference point having the third predetermined distance from the second reference point; and a classified image scanning and processing portion to respond to the detected first, second, third, and fourth reference points, controls the image sensor to scan between the first and third reference points and between the second and fourth reference points as an outstanding-periphery portion of the image of the original document, and controls the image sensor to scan between the third and fourth reference points as a general portion of the image of the original document.

13. The apparatus according to claim 12, wherein the classified image scanning and processing portion controls the image sensor to scan a predetermined line as the outstanding-periphery image after the first side is detected, and controls the image sensor to scan past the predetermined line in the moving direction of the image sensor as the general portion.

14. A method comprising:

moving an image sensor a single time from a first side of a document to a second side of the document opposite the first side;

detecting a size of the document during the moving comprising detecting first and second end points of a first side of the document; and scanning the document between the first and second end points during the moving and after the detecting of the first and second end points.

15. The method according to claim 14, wherein the scanning comprises scanning the document line by line.

16. The method according to claim 14, wherein the scanning comprises scanning a rectangular document.

17. The method according to claim 14, further comprising:
detecting second and third straight line images; and
determining whether the second and third straight line images are respectively second and third sides of the document.

18. The method according to claim 14, wherein the moving comprises moving the image sensor only within an area of the scanned document.

19. A method comprising:

moving an image sensor a single time from a first side of a document to a second side of the document opposite the first side;

detecting a size of the document during the moving;

scanning the document during the moving;

detecting second and third straight line images; and determining whether the second and third straight line images are respectively second and third sides of the document, wherein the determining whether the second and third straight line images are second and third sides comprises:

detecting first and second end points of the first side; and determining whether the second and third straight line images are further than a predetermined distance from the first and second end points.

* * * * *